United States Patent Office 3,129,260
Patented Apr. 14, 1964

3,129,260
PREPARATION OF A BENZALDOXIME
John Yates, Chestfield, Whitstable, Trevor John Willcox and Derek Alexander Wood, Sittingbourne, and Pieter Ten Haken, Herne Bay, England, assignors to Shell Oil Company, New York, N.Y., a corporation of Delaware
No Drawing. Filed Nov. 29, 1961, Ser. No. 155,845
Claims priority, application Great Britain Jan. 30, 1961
5 Claims. (Cl. 260—566)

This invention relates to a process for preparing 2,6-dichlorobenzaldoxime.

As is shown in copending application Serial No. 62,516, filed October 14, 1960, 2,6-dichlorobenzaldoxime is a useful herbicide. As is shown in copending application Serial No. 152,923, filed November 16, 1961, 2,6-dichlorobenzaldoxime can be converted to the corresponding alpha-amino 2,6-dichlorobenzaldoximes, which are also useful herbicides. 2,6-dichlorobenzaldoxime can be converted to 2,6-dichlorobenzonitrile, yet another useful herbicide. Consequently, it is highly desirable that there be available a process for preparing 2,6-dichlorobenzaldoxime on a large scale.

It has now been discovered that 2,6-dichlorobenzaldoxime can be readily and directly prepared in a single step by reaction of 2,6-dichlorobenzal chloride, 2,6-dichlorobenzyl chloride, or a mixture thereof with hydroxylamine in the presence of a strong mineral acid. These chlorides are readily prepared, in turn from readily available raw materials, according to the process described in copending application Serial No. 155,840, filed November 29, 1961, the description of that process being incorporated herein by reference to provide the background and setting for this invention. As a consequence, the process of Serial No. 155,840, together with the process of this invention, provide a process which is readily adapted to the large-scale production of 2,6-dichlorobenzaldoxime.

Described more formally, the invention comprises a process for preparing 2,6-dichlorobenzaldoxime which comprises reacting a member of the group consisting of 2,6-dichlorobenzal chloride, 2,6-dichlorobenzyl chloride and mixtures thereof with hydroxylamine in the presence of a strong mineral acid.

While any of the strong mineral acids—sulfuric acid, phosphoric acid, hydrochloric acid and nitric acid—can be used, the preferred acid is sulfuric acid. The concentrated acids are employed, which in the case of sulfuric acid, requires that the acid be above 75 percent by weight, preferably 90 percent by weight or more. It is ordinarily unnecessary and indeed is undesirable to use sulfuric acid of greater than 100% concentration, since the fuming acids can cause undesirable side reactions.

The process is carried out by mixing the benzal or benzyl chloride reactant with the hydroxylamine in the presence of the acid. In most cases, it will be found preferable to mix the benzal or benzyl chloride reactant with the acid, and then introduce the hydroxylamine into the resulting mixture, with appropriate means to insure intimate and rapid contact of the reactants.

In general, it is desirable to employ substantially stoichiometric quantities of the reactants. However, this is not to say that in certain cases it may not be desirable to employ small to moderate excesses—say from 5% to 50% excesses—of either reactant to promote the reaction in those cases. Usually it will be found that if an excess of either reactant is required, the hydroxylamine should be in excess.

A weight of acid amounting to at least 50% of the weight of the benzal or benzyl chloride should be used, and in most cases, it will be found desirable to employ at least as much acid as chloride. In general, it will be found unnecessary to employ more than about 20 parts by weight of acid per part by weight of chloride. Usually, about 2 parts by weight of acid per part by weight of chloride will be found optimum.

The reaction can be carried out at room temperature (15° C.), but ordinarily it will be found better to carry it out at a temperature of at least about 30° C. Preferably, the temperature is maintained below 70° C., with optimum results usually obtained at temperatures between 45° C. and 60° C.

A reaction time of at least about 30 minutes is ordinarily required, with a minimum reaction time of about 2–3 hours being employed. Inasmuch as it appears that no significant amount of side reactions occur, the reaction time can be extended as necessary to insure complete reaction.

The benzaldoxime product can be recovered by orthodox methods. In most cases, it will be found that the product is readily recovered by mixing the reaction mixture with ice water, filtering off the product, then purifying it by crystallization techniques.

The process of this invention is illustrated in the following examples, wherein application of the process in particular instances is described in detail.

*Example I*

To a stirred mixture of concentrated sulphuric acid (290 grams, 98% by weight $H_2SO_4$) and 2,6-dichlorobenzalchloride (23 grams, 0.1 mol.) at room temperature was added hydroxylamine hydrochloride (14.0 grams, 0.2 mol.) in portions. The mixture was then stirred at 50–55° C. for three hours and added slowly with stirring to a mixture of ice and water. The oxime was collected, dried (yield: 87%) and crystallized from benzene. Melting point (after four recrystallizations) 133–137° C.

*Example II*

A mixture of 23 grams of 2,6-dichlorobenzalchloride, 29 grams of conc.-sulphuric acid and 7.0 grams of hydroxylaminohydrochloride was stirred for three hours at a temperature of 50–55° C. The thus stirred mixture was poured into ice water (0.5 litre), filtered off, washed and dried in vacuum. The resulting 2,6-dichlorobenzaldoxime was obtained in an amount of 18.5 grams (97% of the theoretical yield).

Substitution of 2,6-dichlorobenzyl chloride or a mixture of 2,6-dichlorobenzal chloride and 2,6-dichlorobenzyl chloride results in essentially the same yields of 2,6-dichlorobenzaldoxime.

*Example III*

2,6-dichlorobenzaldoxime is readily converted to 2,6-dichlorobenzonitrile. Thus, by using acetic anhydride, the oxime is converted into the nitrile in a yield of 92%.

We claim as our invention:

1. A process for preparing 2,6-dichlorobenzaldoxime which comprises mixing, at a temperature of from about 15° C. to about 70° C., and thereby effecting reaction between, a chloride of the group consisting of 2,6-dichlorobenzal chloride, 2,6-dichlorobenzyl chloride and mixtures thereof and hydroxylamine in the presence of a strong mineral acid, the amount of hydroxylamine being approximately the theoretical amount required to react with all of said chloride reactant, and the amount of said acid being from about one-half to about twenty times the weight of said chloride reactant.

2. A process according to claim 1 wherein the acid is concentrated sulfuric acid.

3. A process for preparing 2,6-dichlorobenzaldoxime which comprises mixing, at a temperature of from about 15° C. to about 70° C. and thereby effecting reaction between 2,6-dichlorobenzal chloride and hydroxylamine in the presence of a strong mineral acid, the amount of hydroxylamine being approximately the theoretical amount required to react with all of said chloride reactant, and the amount of said acid being from about one-half to about twenty times the weight of said chloride reactant.

4. A process according to claim 3 wherein the acid is concentrated sulfuric acid.

5. A process for preparing 2,6-dichlorobenzaldoxime which comprises mixing, at a temperature of from about 15° C. to about 70° C., and thereby effecting reaction between, a chloride of the group consisting of 2,6-dichlorobenzal chloride, 2,6-dichlorobenzyl chloride and mixtures thereof and hydroxylamine in the presence of a strong mineral acid, the amount of hydroxylamine being moderately in excess of the theoretical amount required to react with all of said chloride reactant, and the amount of said acid being about one-half to about twenty times the weight of said chloride reactant.

References Cited in the file of this patent

UNITED STATES PATENTS 1,051,578   Grether _____ Jan. 28, 1913

FOREIGN PATENTS 13,599   Great Britain _____ 1907